(12) United States Patent
Meindl et al.

(10) Patent No.: US 10,083,386 B2
(45) Date of Patent: Sep. 25, 2018

(54) SMART OBJECTS

(71) Applicant: NXP B.V., Eindhoven (NL)

(72) Inventors: Reinhard Meindl, Graz (AT); Franz Amtmann, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/411,955

(22) Filed: Jan. 20, 2017

(65) Prior Publication Data

US 2017/0206386 A1 Jul. 20, 2017

(30) Foreign Application Priority Data

Jan. 20, 2016 (EP) .................................... 16152025

(51) Int. Cl.
*G06K 19/07* (2006.01)
*H04B 5/00* (2006.01)

(52) U.S. Cl.
CPC ..... *G06K 19/0724* (2013.01); *G06K 19/0723* (2013.01); *H04B 5/0031* (2013.01); *H04B 5/0037* (2013.01)

(58) Field of Classification Search
CPC ................. G06K 19/0724; G06K 19/0723
USPC ............................................. 340/10.4–10.42
See application file for complete search history.

(56) References Cited

U.S. PATENT DOCUMENTS

| 6,516,366 B1 * | 2/2003 | Gates ................... G06F 13/385 |
| | | 710/105 |
| 9,558,383 B2 * | 1/2017 | Tiernay ..................... G01S 7/36 |
| 2009/0011706 A1 | 1/2009 | Wilson et al. |
| 2011/0127843 A1 | 6/2011 | Karaoguz et al. |
| 2011/0163857 A1 | 7/2011 | August et al. |
| 2014/0347007 A1 | 11/2014 | Kee et al. |
| 2015/0194814 A1 | 7/2015 | Taylor et al. |
| 2015/0207340 A1 | 7/2015 | McFarthing |

FOREIGN PATENT DOCUMENTS

| EP | 2 692 067 B1 | 1/2015 | |
| JP | 5377225 B2 * | 12/2013 | ............. G06K 17/02 |
| WO | WO-01/06444 A1 | 1/2001 | |
| WO | WO-2009/058122 A1 | 5/2009 | |

OTHER PUBLICATIONS

Extended European Search Report for Patent Appln. No. 16152025.9 (dated Jun. 29, 2016).

\* cited by examiner

*Primary Examiner* — Allen T Cao

(57) ABSTRACT

An object is disclosed, the object (100) comprising a body comprising an antenna; and an integrated circuit embedded in the body and electrically connected to the antenna for receiving and transmitting wireless signals. The integrated circuit receives wireless signals at first and second different frequencies, waits until a command is received at the first frequency from a first reader device before transmitting a first signal and, upon detection of a signal at a second frequency different to the first frequency from a second reader device (201), transmits a second signal without waiting until a command is received.

20 Claims, 3 Drawing Sheets

SMART OBJECTS

CROSS-REFERENCE TO RELATED APPLICATIONS

This application claims the priority under 35 U.S.C. § 119 of European patent application no. 16152025.9, filed on Jan. 20, 2016, the contents of which are incorporated by reference herein.

FIELD

The disclosure relates to objects incorporating an integrated circuit and an antenna for wireless communication.

BACKGROUND

Wireless devices are now a common part of everyday life. Contactless smart objects, such as contactless smartcards or contactless smart labels, are particularly well known. Contactless smart objects may for example be based on 13.56 MHz transmission technology, as standardised under ISO/IEC 14443 and ISO/IEC 15693 and ISO/IEC 18000-X Another area of wireless technology that is becoming more common is inductive charging. Inductive charging can be used to charge devices, such as mobile phones, without requiring a wired connection to a power source. Inductive charging typically requires a strong alternating magnetic field to induce a voltage in the charging device. In some cases this can result in damage to objects with thin conductive elements such as antenna components in smartcards. One inductive charging system developed by the Alliance for Wireless Power (A4WP, also known as Rezenze) operates at 6.78 MHz, and is currently undergoing a standardisation process.

SUMMARY

In accordance with a first aspect of the present disclosure there is provided an object comprising:
a body comprising an antenna; and
an integrated circuit embedded in the body and electrically connected to the antenna for receiving and transmitting wireless signals,
wherein the integrated circuit is configured to receive wireless signals at first and second different frequencies, to wait until a command is received at the first frequency from a first reader device before transmitting a first signal and, upon detection of a signal at a second frequency different to the first frequency from a second reader device, to transmit a second signal without waiting until a command is received.

The integrated circuit may also be configured to obtain electrical power from a received wireless signal at the first or second frequency.

In alternative embodiments the object may comprise a power source to provide electrical power to the integrated circuit, for example where the integrated circuit is configured to communicate via an alternating magnetic field.

Communication with, and optionally also powering of, the object may be done using radio waves, for example within the UHF band, in which the selection process, i.e. selecting whether the object or the reader communicates first, can be carried out based on the input frequency and powering done using alternating electric fields.

The electrical connection between the integrated circuit and the antenna may be provided by a galvanic connection or a capacitive connection.

In normal operation, the object may operate at the first frequency in a RTF (reader talks first) mode, where the object waits silently until a reader communicates with the object, for example by issuing a valid command. If the second frequency is detected, however, the object may operate in a TTF (tag talks first) mode, where the object communicates first, for example by transmitting data as soon as an alternating magnetic field is detected that is above a certain minimum threshold level. The second frequency may for example be associated with the magnetic field of an inductive charging device.

In some embodiments the first signal may comprise an identification signal, which may be a message containing a data package, or a sequence of data packages, sent by the object on the first frequency. Alternatively or additionally, the second signal may comprise an identification signal, which may also be a message containing a data package, or a sequence of data packages, sent by the object on the second frequency. The identification signal may comprise a message that contains data indicating a unique identification code for the object.

In some embodiments the second signal comprises instructions for the second reader device to reduce a transmission power of the second signal. If, for example, the second frequency is associated with an inductive charging device, the second signal may be an instruction to reduce the strength of the magnetic field to limit any damage to the smart object caused by the magnetic field. Reducing the transmission power may include turning off the transmission.

The integrated circuit may be configured to filter the received wireless signals into the first and second frequencies, to measure the relative amplitude of the filtered signals, and to wait until a command is received at the first frequency if the amplitude of the filtered first frequency is higher.

The integrated circuit may alternatively be configured to determine a frequency of a received signal from a measure of charge on a capacitor charged by a rectified received signal during a set period of time.

The integrated circuit may alternatively be configured to determine a frequency of the received signal by comparing a clock frequency derived from the received signal with a frequency of an internal oscillator.

In some embodiments the second frequency is lower than the first frequency. The second frequency may for example be between 6.765 and 6.795 MHz. The first frequency may for example be between 13.553 and 13.567 MHz.

In example embodiments, at the first, higher, frequency, a higher number of objects may be accommodated, whereas at the second, lower, frequency a lower number of objects may be accommodated but communicating with a higher communication speed.

In accordance with a second aspect of the present disclosure there is provided a method of communication between an object and a reader, the object comprising a body comprising an antenna and an integrated circuit embedded in the body and electrically connected to the antenna for receiving and transmitting wireless signals, the method comprising:
receiving a wireless signal by the object from the reader;
If the received wireless signal is at a first frequency, the object waiting until a command is received from the reader before transmitting a first signal at the first frequency; and
if the received wireless signal is at a second frequency different to the first frequency, transmitting a second signal without waiting until a command is received.

The second signal may comprise instructions for the reader to reduce a transmission power of the second signal.

The second frequency is lower than the first frequency.

Other features according to the first aspect, as described above, may also be applicable to the second aspect.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
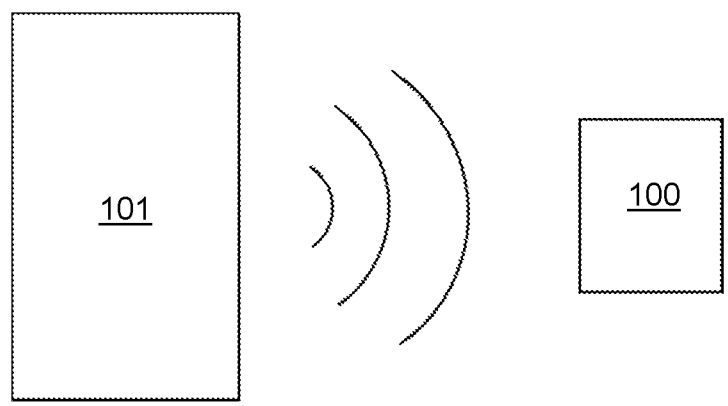
FIG. 1 illustrates a schematic representation of an example object in the presence of a reader operating at a first frequency.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

An example of a contactless smart object 100 is shown in FIG. 1 a. The object 100 may be for example a contactless smartcard, such as a contactless credit card or contactless key or key card. The object is not limited to any particular shape, size or application and may be embodied in many different applications. The object 100 comprises a body comprising an antenna. The antenna may be a dipole antenna, for example configured to operate within the ultra high frequency (UHF) range of radio frequencies, or any other frequency of electromagnetic radiation. A dipole antenna may be used to transmit and detect electromagnetic radiation to and from a reader 101. Alternatively the antenna may be a loop antenna, for example operating in near field in the low frequency (LF), high frequency (HF), or ultra UHF ranges. A loop antenna may be used as a transformer, where an alternating magnetic field induces a voltage in the loop. The integrated circuit may be powered solely by received wireless signals, or may contain an internal power source such as a battery.

In a first mode of operation, the object 100 communicates with a device 101 at a first frequency. The first frequency may be between 13.553 and 13.567 MHz, for example 13.56 MHz as used in ISO/IEC standards 14443 and 15693. In the first mode, the object 100 operates in a RTF mode, where the reader 101 sends the first communication, for example a command. In response to this command, the object 100 transmits a first signal, for example an identification signal, to the reader 101.

Figure 2:
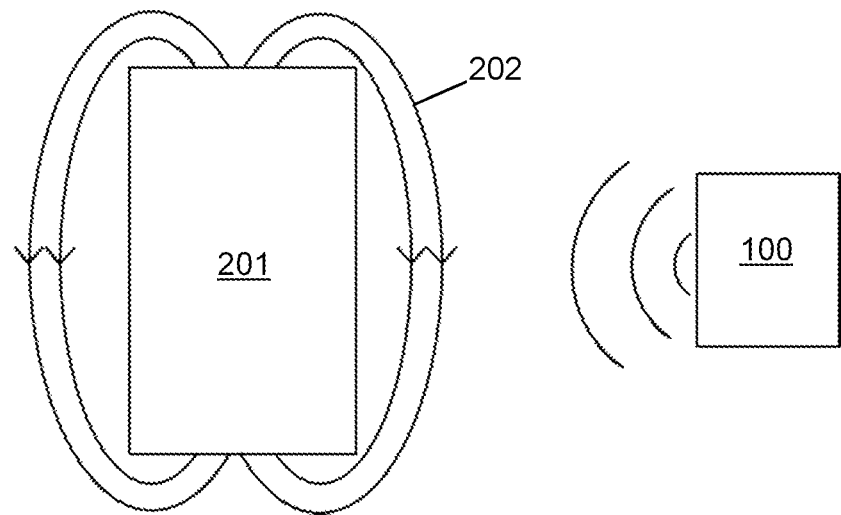
FIG. 2 illustrates a schematic representation of the example object in the presence of a device operating at a second frequency.

An example of the second mode of operation of the object 100 is illustrated in FIG. 2. In FIG. 2, a device 201 induces a magnetic field 202 in the area surrounding the device 201. The magnetic field 202 alternates at a second frequency, for example between 6.765 and 6.795 MHz, such as the 6.78 MHz used by the A4WP system. Although typically the first frequency is higher than the second frequency, in some embodiments the second frequency may be higher than the first frequency. Typically only one of the first and second frequencies will be present at any one time, but in some embodiments both signals may be present at the same time. The object 100 may determine which signal is stronger, and select the mode of operation suitable for that frequency. If both frequencies are present at the same time the object can effectively ignore one frequency, for example the frequency having the lower level, provided the level does not exceed a predetermined threshold.

The device 201 may for example be an inductive charging device, which uses a strong magnetic field to charge other devices, such as mobile phones.

A strong alternating magnetic field may damage the object 100, for example by inducing high currents in thin conductive components, generating heat. Any power dissipation in the integrated circuit (IC) is more critical, since any voltage present at the input pins of the IC must be limited to prevent high currents within the IC.

If the object 100 detects the second frequency, it switches to a TTF mode, where the object sends the initial communication. The object 100 transmits a signal to the device 201, for example a command for the device 201 to reduce the power of its transmission, for example by reducing the strength of the magnetic field it generates. In this way, damage to the object 100 may be avoided. In some embodiments, any signal from the object when operating in TTF mode that is detected by the device 201 may result in a change of the magnetic field, for example a change in modulation of the field.

Figure 3:
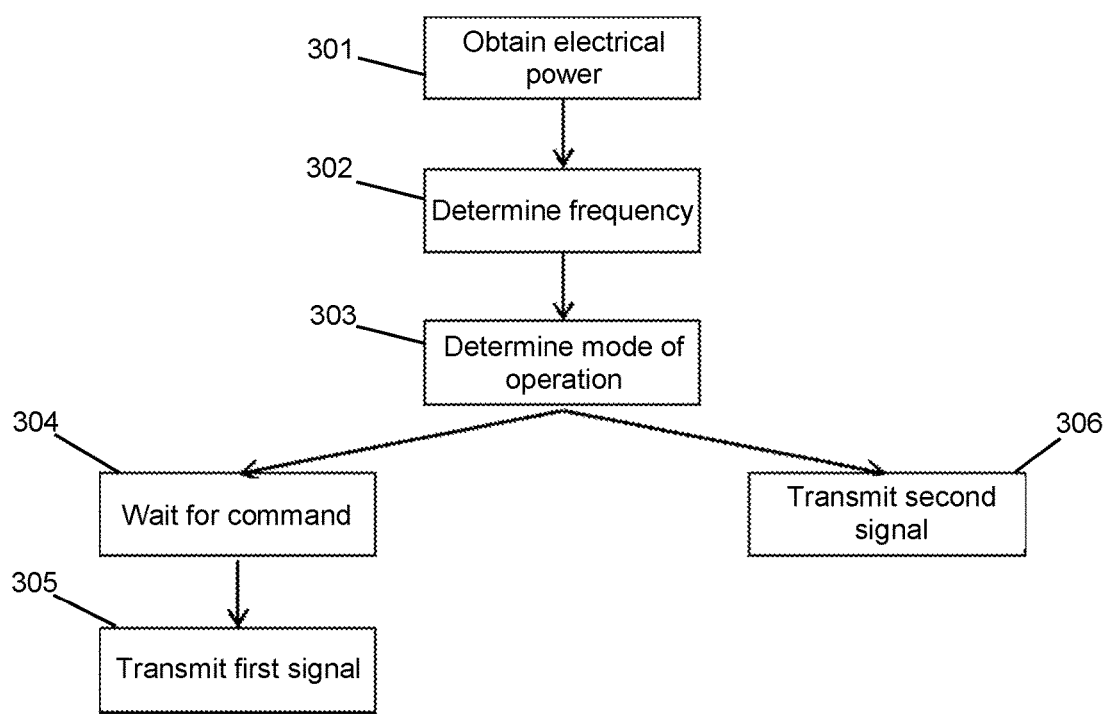
FIG. 3 illustrates a block flow diagram indicating an example sequence of operations of the object.

FIG. 3 is a block diagram illustrating operation of the object 100. At a first step 301, the object obtains electrical power from received wireless signals using the object's antenna. The electrical power may for example be created by a radio or other electromagnetic signal transmitted by a reader, or induced by a magnetic field generated by a device such as an inductive charging device.

At step 302, the object determines the frequency of the detected radiation, for example assigning the frequency to a first frequency or a second frequency. Radiation may be detected at both frequencies, in which case the object can determine the stronger signal to select. For example, if a stronger signal is detected at the second frequency the object will enter a TTF mode, whereas if the signal at the second frequency is weak compared with a signal at the first frequency the object will enter a RTF mode and wait for a command to be received. Further frequencies may be available to be selected.

At step 303, the object determines a mode of operation based on the frequency of the detected radiation. For example, if the first frequency is detected, the object enters a first mode of operation, for example a RTF mode. If the second frequency is detected, the object enters a second mode of operation, for example a TTF mode.

If the first mode is selected, the operation proceeds to step 304. At this step, the object waits for a command to be received from a reader. Once a command has been received, the object transmits a first signal, for example an identification signal, at step 305.

Alternatively, if the second mode is selected, the operation proceeds from step 303 to step 306. At step 306, the object transmits a second signal without waiting for a command. The second signal may for example be a command to reduce the power of a magnetic field, or to switch off the power completely.

Figure 4:
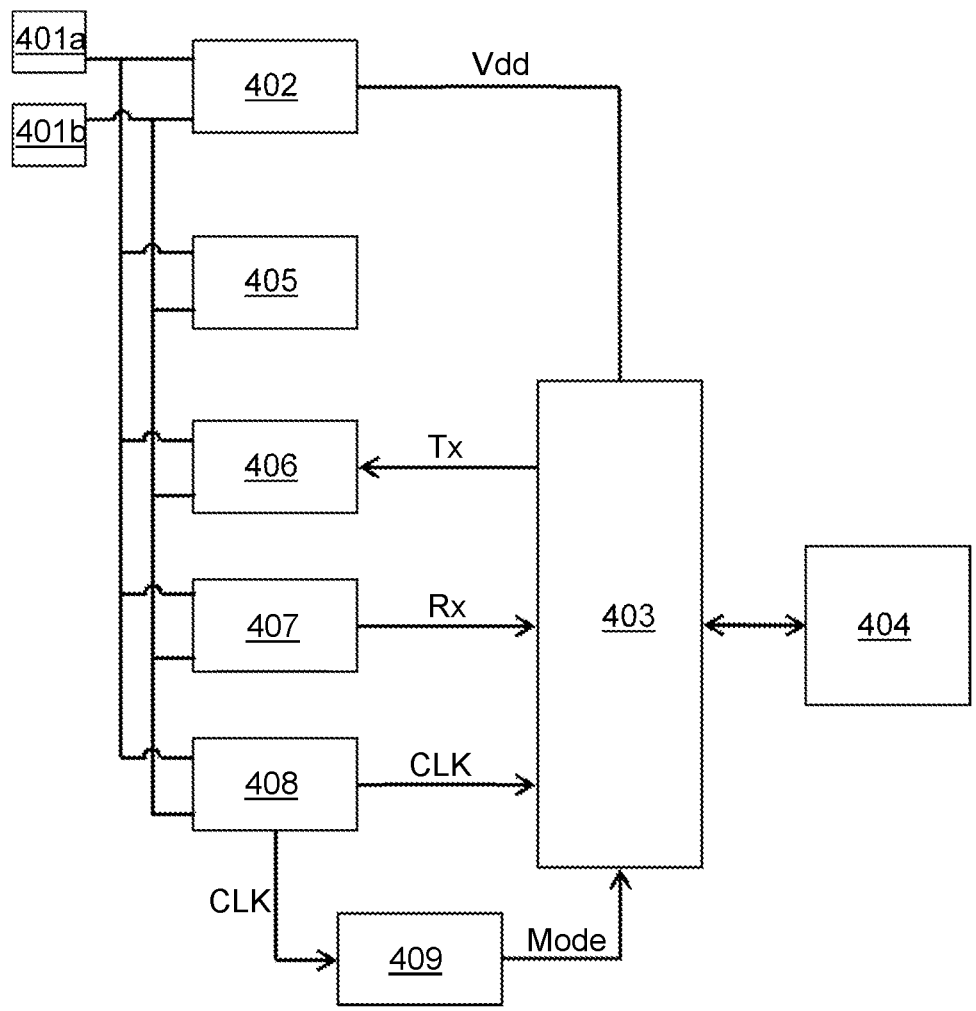
FIG. 4 illustrates a schematic block diagram representing various components of the object.

FIG. 4 illustrates schematically various components of the exemplary object 100. Electric power from wireless signals is obtained via an antenna, which is received via antenna connections 401a and 401b. A rectifier or charge pump 402 uses this to generate a supply voltage Vdd from the received electrical power, which is used to power a digital state machine or micro-controller 403. A memory 404 is associated with, or integrated into the micro-controller 403. Memory 404 may for example be EEPROM or MTP memory.

A resonance capacitance 405, modulator 406 and demodulator 406 are connected to antenna connections 401a, 401b. The modulator 406 is used to modulate a signal for transmission Tx produced by the micro-controller 403 or state machine. The demodulator 407 is used to demodulate a received signal, and to communicate the demodulated signal Rx to the micro-controller 403 or state machine. A clock recovery module 408, also connected to antenna connections 401a and 401b, provides a clock signal CLK to the micro-controller 403.

The mode of operation, i.e. the first mode or second mode, is determined by a mode determining module 409, which determines the frequency of the received signals based on the clock signal CLK, and from that determines which mode of operation the micro-controller 403 should operate in. The mode determining module 409 may be either an analogue or a digital device.

If the mode determining module 409 is analogue, the mode may be determined for example by filtering the received signal into first and second frequencies, and measuring the amplitude after filtering. For example if the signal is of the first frequency then the output voltage of the first filter would be higher than the output voltage of the second filter, and so the first mode of operation would be selected. The mode determining module 409 may use a phase locked loop (PLL) containing a voltage controlled oscillator (VCO) to provide frequency information. The received signal may be used to charge a capacitor during a defined period of time, which is discharged with a resistor or a current sink. The voltage of the capacitor or discharging time is related to the frequency of the input signal, allowing a determination of the frequency of the input signal.

Alternatively, if the mode determining module 409 is digital, the mode may be determined for example by counting pulses (clock cycles) and comparing with a second counter driven by an internal oscillator. The internal oscillator may for example be selected to oscillate at a frequency between the first frequency and the second frequency, or at the first or the second frequency. Parts or multiples of these frequencies are also possible. Alternatively, the unstable state of a monostable multivibrator (monoflop), with a known, fixed turn on time, may be triggered by one edge (e.g. positive) of the input signal from the received electrical power. By determining whether the next edge (negative or succeeding positive) of the input signal or the turn off event of the monoflop occurs next, the frequency and hence mode of operation can be determined.

In some embodiments, any or all of the components 401-409 may be integrated together in a common integrated circuit chip.

From reading the present disclosure, other variations and modifications will be apparent to the skilled person. Such variations and modifications may involve equivalent and other features which are already known in the art of contactless smart objects, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. An object comprising:
a body comprising an antenna; and
an integrated circuit embedded in the body and electrically connected to the antenna for receiving and transmitting wireless signals,
wherein the integrated circuit is configured to receive wireless signals at first and second different frequencies, to wait until a first command is received at the first frequency from a first reader device before transmitting a first signal and, upon detection of a third signal at a second frequency different to the first frequency from a second reader device, to transmit a second signal without waiting until a second command is received.

2. The object of claim 1 wherein the integrated circuit is configured to obtain electrical power from a received wireless signal at the first or second frequency.

3. The object of claim 1, further comprising a power source to provide electrical power to the integrated circuit.

4. The object of claim 1, wherein the first signal comprises an identification signal.

5. The object of claim 1, wherein the second signal comprises an identification signal.

6. The object of claim 1, wherein the second signal comprises instructions for the second reader device to reduce or to completely switch off a transmission power of the second reader device.

7. The object of claim 1, wherein the integrated circuit is configured to filter the received wireless signals into the first and second frequencies, to measure the relative amplitude of the filtered signals, and to wait until the first command is received at the first frequency if the amplitude of the filtered first frequency is higher.

8. The object of claim 1, wherein the integrated circuit is configured to determine a frequency of a received signal from a measure of charge on a capacitor charged by a rectified received signal during a set period of time.

9. The object of claim 1, wherein the integrated circuit is configured to determine a frequency of the received signal by comparing a clock frequency derived from the received signal with a frequency of an internal oscillator.

10. The object of claim 1, wherein the second frequency is lower than the first frequency.

11. The object of claim 1, wherein the second frequency is between 6.765 and 6.795 MHz.

12. The object of claim 1, wherein the first frequency is between 13.553 and 13.567 MHz.

13. A method of communication between an object and a reader, the object comprising a body comprising an antenna and an integrated circuit embedded in the body and electrically connected to the antenna for receiving and transmitting wireless signals, the method comprising:

receiving a wireless signal by the object from the reader;

if the received wireless signal is at a first frequency, the object waiting until a first command is received from the reader before transmitting a first signal at the first frequency; and if the received wireless signal is at a second frequency different to the first frequency, the object transmitting a second signal without waiting until a second command is received.

14. The method of claim 13 wherein the second signal comprises instructions for the reader to reduce a transmission power at the second frequency.

15. The method of claim 13, wherein the second frequency is lower than the first frequency.

16. A computer program comprising non-transitory, executable instructions which, when executed by the object, carry out or control the method of claim 13.

17. The object of claim 1, wherein the detection of the third signal at the second frequency comprises:

detection of an alternating magnetic field that is above a certain minimum threshold level.

18. The object of claim 1, wherein the second reader device is an inductive charging device, wherein the second frequency is associated with a magnetic field of the inductive charging device.

19. An object comprising:

a body comprising an antenna; and an integrated circuit embedded in the body and electrically connected to the antenna for receiving and transmitting wireless signals, wherein the integrated circuit is configured to receive wireless signals at a first frequency and a second frequency, wherein the first frequency and the second frequency are different frequencies, wherein the object operates at the first frequency in a RTF (reader talks first) mode, wherein the object waits silently until a device communicates with the object by issuing a first command, wherein the object operates at the second frequency in a TTF (tag talks first) mode, wherein the object communicates first, by transmitting a second signal as soon as a third signal at the second frequency is detected.

20. The object of claim 19, wherein the third signal at the second frequency is associated with an inductive charging device, wherein the second signal comprises instructions for the inductive charging device to reduce or to completely switch off a transmission power at the second frequency, in order to avoid damage to the object.

* * * * *